United States Patent [19]

Boccuti

[11] 4,445,762
[45] May 1, 1984

[54] ENCODED SHUTTER BLADE APPARATUS

[75] Inventor: A. David Boccuti, Cambridge, Mass.

[73] Assignee: Polaroid Corporation, Cambridge, Mass.

[21] Appl. No.: 454,047

[22] Filed: Dec. 28, 1982

[51] Int. Cl.$^3$ .............................................. G03B 7/14
[52] U.S. Cl. ................................... 354/437; 354/458; 354/480
[58] Field of Search ....................... 354/26, 27, 28, 29, 354/30, 60 A, 247, 23 D

[56] References Cited

U.S. PATENT DOCUMENTS

| | | | |
|---|---|---|---|
| 3,942,183 | 3/1976 | Whiteside | 354/29 |
| 4,009,866 | 3/1977 | Iwata et al. | 354/29 |
| 4,040,072 | 8/1977 | Johnson et al. | 354/173 |
| 4,053,907 | 10/1977 | Iwata et al. | 354/29 |
| 4,075,641 | 2/1978 | Uno et al. | 354/60 A |
| 4,317,624 | 3/1982 | Shenk | 354/139 |
| 4,345,828 | 8/1982 | Johnson | 354/29 |

Primary Examiner—Russell E. Adams
Attorney, Agent, or Firm—Edward S. Roman

[57] ABSTRACT

An encoding system for a shutter blade arrangement of the scanning type comprising a plurality of spaced apart slits in each of the shutter blade elements arranged to sequentially overlap each other between a source of illumination and a photoresponsive element during displacement of the shutter blade elements to provide an output waveform indicative of the instantaneous position of the shutter blade elements with double the resolution or accuracy heretofore provided by shutter blade encoding systems having identically sized and spaced slits.

10 Claims, 20 Drawing Figures

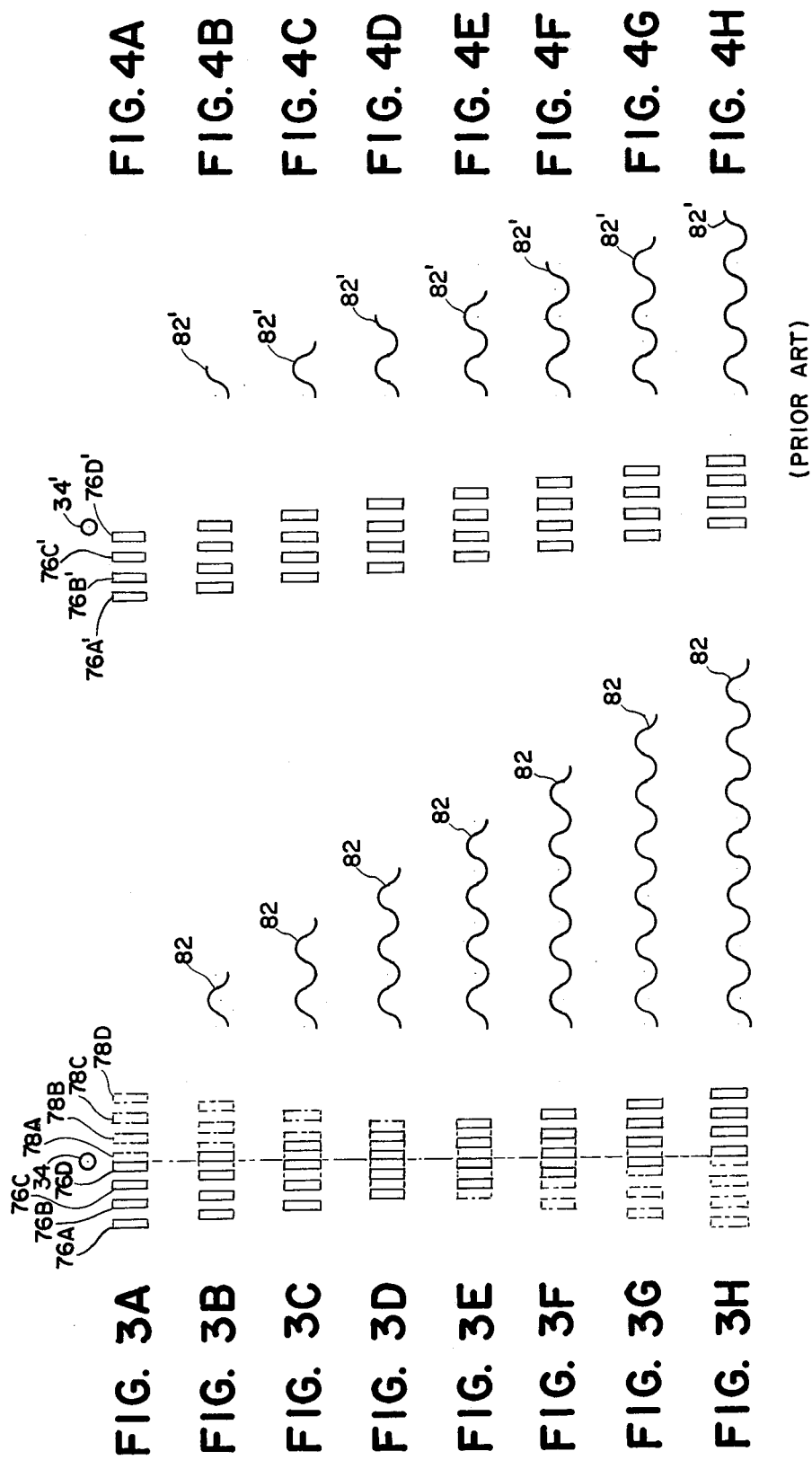

ENCODED SHUTTER BLADE APPARATUS

BACKGROUND OF THE INVENTION

1. Field of the Invention

This invention relates generally to an improved shutter blade encoding system and, more particularly, to an improved shutter blade encoding system for a shutter blade arrangement of the so-called scanning type.

2. Description of the Prior Art

One well-known exposure control mechanism for a photographic camera is a so-called scanning blade shutter comprising two cooperatively moving shutter blade elements connected for opposed reciprocating movement with respect to each other. The shutter blade elements are formed with selectively shaped aperture openings which, depending upon the position of the blades, symmetrically overlap over a light entry exposure opening within the camera housing. The blade elements are connected to define a progression of apertures over the light entry opening in the camera as a result of their connection with a so-called "walking beam" or actuator which is rotatably mounted with respect to the camera housing. Thus interconnected, the shutter blade elements move simultaneously and in correspondence with each other to define a symmetrically configured and variable aperture opening over the camera light entry exposure opening.

In shutter blade arrangements of the abovedescribed type, it is often necessary to electronically track the exact position of the shutter blade elements during the exposure interval. Toward this end, there have been provided shutter blade encoding systems of a type as is disclosed in U.S. Pat. No. 4,053,907, entitled "Program Controlled Shutter", by H. Iwata et al., issued Oct. 11, 1977. The aforementioned encoding system comprises a plurality of aligned slits on one of the shutter blade elements disposed intermediate a light source and a photocell so that movement of the aligned slits between the light source and photocell provide an output signal waveform indicative of the instantaneous position of the shutter blade element. The resolution or accuracy at which the instantaneous position of the shutter blade element may be determined depends upon the width and spacing of the slits which can be provided in the shutter blade elements as well as the width of the photocell which cannot exceed the width of one slit. Thus, in exposure control systems where a high degree of resolution or accuracy is desired as to the determination of the instantaneous blade position, it may not be possible or practical to make sufficiently thin slits as well as a sufficiently small photocell to provide the degree of accuracy required.

Therefore, it is a primary object of this invention to provide an improved shutter blade encoding system in which the resolution or degree of accuracy at which the blade position may be determined is doubled without incurring a decrease in the width of the slits heretofore provided in shutter blade encoding systems.

It is a further object of this invention to provide an improved shutter blade encoding system in which the overall size of the photoresponsive element may exceed the width of an individual slit and may even overlap a plurality of slits.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An improved shutter blade encoding system is provided for use in a photographic camera apparatus of the type which includes means for defining a film plane, means for transmitting light from a scene along an optical path to expose photosensitive film located in the film plane, and an exposure control system for allowing the passage of scene light along the optical path of the film plane for a period of time to define the exposure interval wherein the exposure control system comprises at least two overlapping shutter blade elements disposed for displacement in generally opposing directions with respect to each other. The improved shutter blade encoding system comprises a means for sensing the position of the blade elements responsive to the displacement of the blade elements and for providing an output representative of the instantaneous position of the blade elements. The position sensing means comprises a source of illumination on one side of the blade elements and a photoresponsive element on the other side of the blade elements opposite the source of illumination. The sensing means further includes a plurality of equally spaced apart like apertures in each of the blade elements located such that the apertures in one of the blade elements sequentially overlap the apertures in the other blade elements upon the displacement of the blade elements so as to control the transmission of light from the source of illumination to the photoresponsive element.

The blade encoding system also includes means for comparing the output from the photoresponsive element with the average value of the output of the photoresponsive element to provide an output squarewave having a frequency corresponding to the frequency at which the encoding apertures in one of the blade elements overlaps the encoding apertures in the other of the blade elements upon blade displacement. Means are also provided for converting the squarewave to a pulse train wherein each of the pulses in the pulse train corresponds to either a leading edge or a trailing edge of the squarewave. Means are also provided for counting the pulses in the pulse train to provide an output pulse count indicative of the instantaneous position of the blades.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein:

FIG. 1B is a cross-sectional view taken along the lines 1B—1B of FIG. 1;

FIGS. 3A–3H are front elevational views showing the encoding slits of FIG. 1 in different positions corresponding to different positions of the shutter blade elements;

FIGS. 4A–4H show the encoding slits of a conventional shutter blade arrangement in different positions corresponding to different positions of the shutter blade elements.

DESCRIPTION OF THE PREFERRED EMBODIMENT

Figure 1:
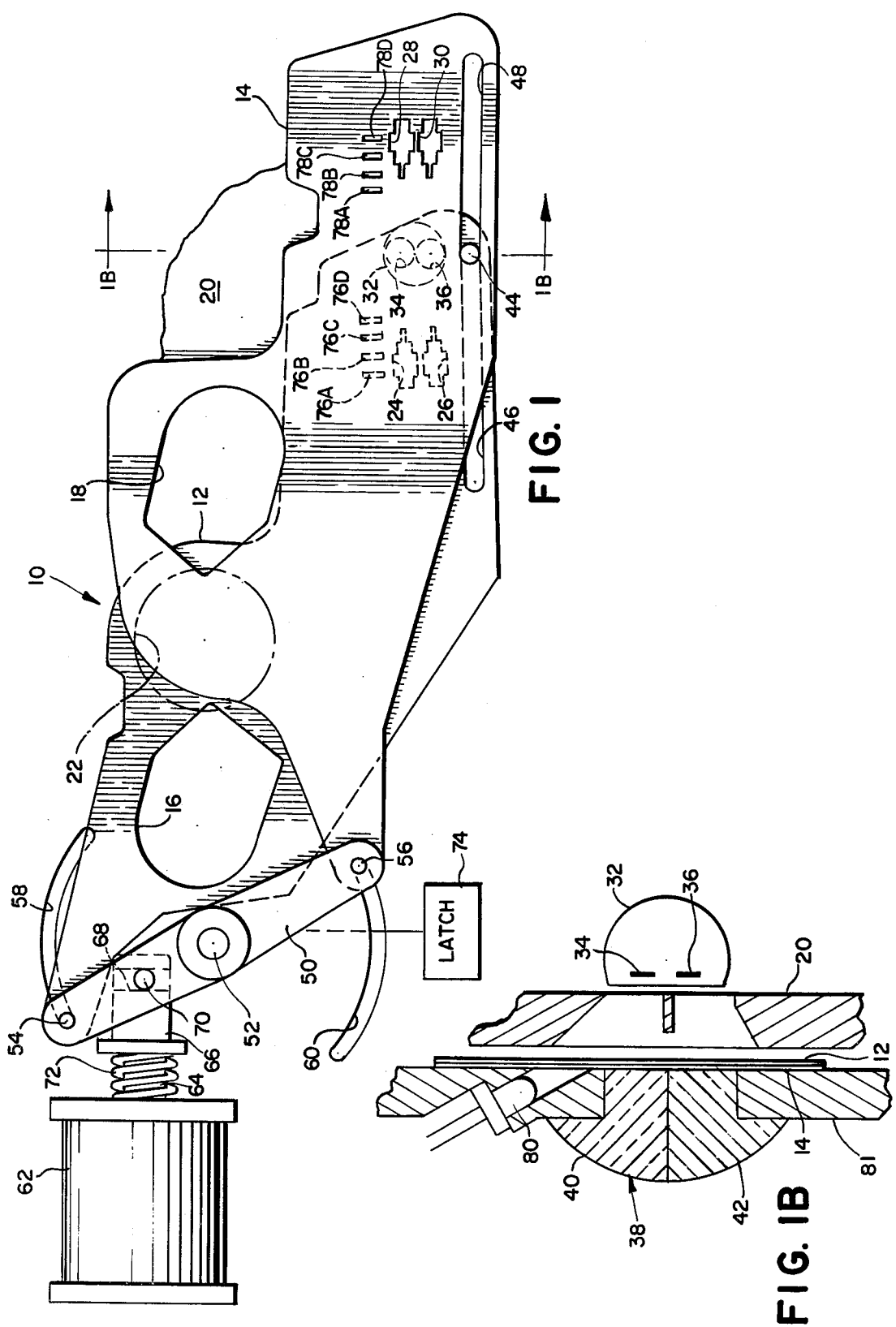
FIG. 1 is a front elevational view showing a shutter blade arrangement employing the encoding system of this invention.
Figure 2:
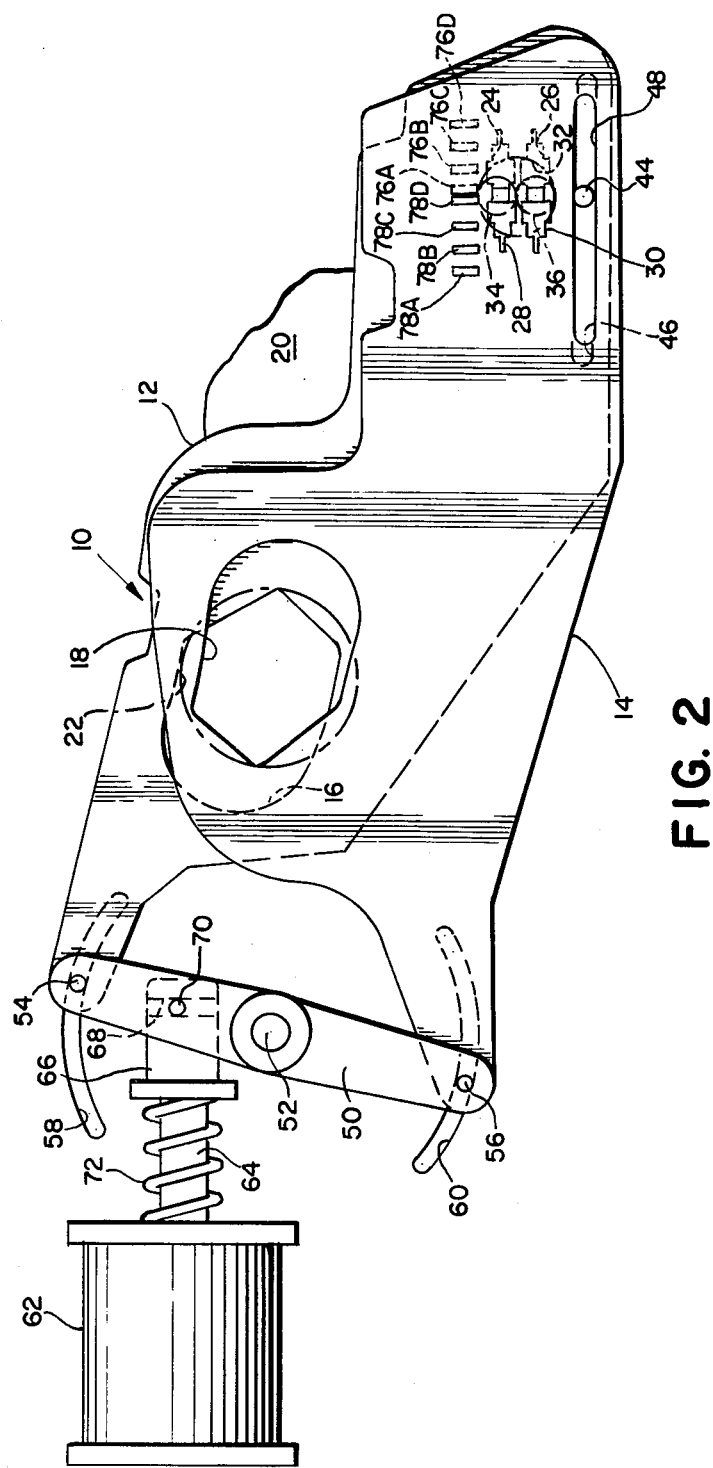
FIG. 2 is a front elevational view showing the shutter blade arrangement of FIG. 1 in a different position.

Referring now to FIGS. 1 and 2, there is shown a shutter mechanism 10 comprising two overlapping shutter blade elements 12 and 14 of the so-called scanning type. The shutter mechanism 10 is disposed intermediate a film plane (not shown) and an objective lens arrangement (also not shown) which defines an optical path to transmit light from the scene to expose a photosensitive film located in the film plane in a manner as is fully disclosed in U.S. Pat. No. 3,942,183, entitled "Camera With Pivoting Blades", by George D. Whiteside, issued Mar. 2, 1976, in common assignment herewith and now incorporated by reference herein. The shutter mechanism 10 controls the passage of scene light along the optical path for a period of time to define an exposure interval in a well-known manner.

A pair of scene light admitting primary apertures 16 and 18 are provided, respectively, in the blade elements 12 and 14 to collectively define a progressive variation of effective primary aperture openings in accordance with simultaneous longitudinal and lateral displacement of one blade element with respect to the other blade element in a manner as is fully described in U.S. Pat. No. 3,942,183, supra. The apertures 16 and 18 are selectively shaped so as to overlap a light entry exposure opening 22 in a baseblock casting 20 thereby defining a gradually varying effective aperture size as a function of the position of the blade elements 12 and 14. The shutter blade element 12 has two spaced apart photocell sweep secondary apertures 24 and 26 which overlap, respectively, two spaced apart photocell sweep secondary apertures 28 and 30 in the shutter blade element 14. The secondary photocell sweep apertures 24, 26, 28 and 30 are configured in correspondence with the shapes of the scene light admitting primary apertures 16 and 18 and, as is readily apparent, move in correspondence with the primary apertures 16 and 18 to define two spaced apart pairs of small secondary apertures for admitting the passage of scene light to a scene light detecting station as shown generally at 32.

The scene light detecting station 32 comprises two photoresponsive elements 34 and 36 which may be discrete photodiodes formed on a single integrated circuit chip as best seen in FIG. 1B. As is readily apparent, the photoresponsive element 34 is aligned to receive scene light by way of the effective secondary aperture defined by the overlapping photocell sweep apertures 24 and 28, while in like manner the photoresponsive element 36 is aligned to receive scene light by way of the secondary effective aperture defined by the overlapping photocell sweep apertures 26 and 30.

Light from the scene is directed to the photocell sweep secondary apertures by a photocell lens 38 having an upper lens portion 40 having no spectral filter overlay and a lower lens portion 42 preferably overlayed with a spectral filter which operates to pass infrared frequencies while blocking visible light frequencies. Thus, the upper lens portion 40 will transmit visible spectral energy as well as infrared spectral energy whereas the lower lens portion 42 will block the transmission of visible spectral energy and allow the transmission of IR frequency spectral energy. It will also be well understood that the upper lens portion 40 could be provided with a spectral filter that would block the transmission of IR frequency spectral energy. Although the preferred embodiment of this invention is utilized in conjunction with a blade mechanism comprising the aforementioned dual photocell sweep aperture configuration and dual photocell lens configuration, which operate in a manner as is more fully described in U.S. patent application Ser. No. 442,238, entitled "Hybrid Camera Arrangement", filed Nov. 16, 1982, it will be understood that the shutter blade encoding arrangement of this invention could also be utilized in more conventional scanning shutter blade arrangements not employing the dual photocell sweep aperture arrangement herein described.

Projecting from the baseblock casting 20 at a location spaced laterally apart from the light entry exposure opening 22 is a pivot pin or a stud 44 which pivotally and translatably engages elongate slots 46 and 48 formed in respective shutter blade elements 12 and 14. Pin 44 may be integrally formed with the baseblock casting 10 and blade elements 12 and 14 may be retained in engaging relation with respect to the pin 44 by any suitable means such as peening over the outside end of the pin 44.

The opposite ends of the blade elements 12 and 14, respectively, include extended portions which pivotally connected to a walking beam 50. The walking beam 50, in turn, is disposed for rotation relative to the baseblock casting 20 by pivotal connection to a projecting pivot pin or stud 52 which may be integrally formed with the baseblock casting 20 at a location spaced laterally apart from the light entry exposure opening 22. The walking beam 50 may be pivotally retained with respect to the pin 52 by any conventional means such as an E ring (not shown). In the preferred mode, the walking beam 50 is pivotally connected at its distal ends to the shutter blade elements 12 and 14 by respective pin members 54 and 56 which extend laterally outward from the walking beam 50. Pin members 54 and 56 are preferably circular in cross section and extend through respective openings in respective blade elements 12 and 14 so as to slidably engage respective arcuate tracks 58 and 60 which may be integrally formed within the baseblock casting 20. The arcuate tracks 58 and 60 operate to inhibit disengagement of the blade elements 12 and 14 from their respective pin members 54 and 56 during operation of the exposure control system. Thus, the walking beam 50 and shutter blade elements 12 and 14 collectively define a blade mechanism together with a means for mounting the blade mechanism for displacement including pivot pins 52 and 44.

Drive means are provided for displacing the blade mechanism 10 and include a tractive electromagnetic device in the form of a solenoid 62 employed to displace the shutter blades 12 and 14 with respect to each other and the baseblock casting 20. The solenoid 62 includes an internally disposed cylindrical plunger unit 64 which retracts inwardly into the body of the solenoid upon energization of the solenoid winding. The plunger 64 includes an endcap 66 at the outside end thereof together with a vertical slot or groove 68 within the endcap 66 for loosely engaging a pin 70 extending outwardly from the walking beam 50. In this manner, the solenoid plunger 64 is affixed to the walking beam 50 so that longitudinal displacement of the plunger 64 will operate to rotate the walking beam around the pivot pin 52 and appropriately displace the shutter blades 12 and 14. The drive means may additionally include a helical compression spring 72 so as to continuously urge the blade elements 12 and 14 into positions defining their largest effective aperture over the light entry exposure opening 22. As will be readily understood, in some shutter blade arrangements, it may be preferable to use a tension spring in place of the compression spring 72 in a manner as is shown in U.S. Pat. No. 4,040,072, entitled "Shutter Latch Arrangement Releasable Through Shutter Blade Actuation and Resettable Through Film Advancement", by Bruce K. Johnson, issued Aug. 2, 1977, in common assignment herewith and now incorporated by reference herein. Thus, with the spring connection herein described, the exposure control system of this invention is biased to continuously urge the shutter blade elements 12 and 14 into an open orientation.

In order that the shutter blade elements 12 and 14 be maintained in their scene light blocking arrangement as shown in FIG. 1 without requiring a continuous energization of the solenoid 62, there is provided a latch mechanism 74 of a type as is fully described in U.S. Pat. No. 4,040,072, supra.

The blade encoding system of this invention comprises a first plurality of equally spaced apart like encoding apertures or slits 76A-76D in blade element 12 and a second plurality of equally spaced apart like encoding apertures or slits 78A-78D in the blade element 14. The encoding apertures 76A-76D and 78A-78D are preferably spaced apart by a distance substantially equal to the width of the encoding apertures. As is readily apparent, clockwise rotation of the walking beam from its position as shown in FIG. 1 to its position as shown in FIG. 2 operates to effect the displacement of the blade elements 12 and 14 so as to cause the scene light admitting primary apertures 16 and 18 to overlap in a manner as to define a progressively increasing primary aperture for admitting scene light to the film plane while simultaneously causing the encoding apertures 76A-76D in the blade element 12 to sequentially overlap the encoding apertures 78A-78D in the blade element 14 in a manner as is best shown in FIGS. 3A-3H. Although only four encoding apertures have been shown in each shutter blade element, it will be readily apparent that any number of encoding apertures may be used and that the number of encoding apertures is not critical to the shutter blade encoding system of this invention.

Referring now to FIG. 1B, it can be seen that a source of illumination in the form of a light emitting diode (LED) 80 is provided on one side of the encoding apertures 76A-76D and 78A-78D. The light emitting diode 80 is fixedly stationed with respect to an exterior housing 81 of the camera as is the photocell lens 38. Light from the LED 80 is transmitted to the photoresponsive element 34 when any one of the encoding apertures 76A-76D overlap any one of the encoding apertures 78A-78D.

Thus, as is readily apparent by referring to the sequence of shutter blade movement illustrated in FIGS. 3A-3H, it can be seen that clockwise rotation of the walking beam operates to displace the encoding apertures 76A-76D in a direction from left to right while simultaneously displacing the encoding apertures 78A-78D in a direction from right to left as viewed in FIGS. 1 and 2. The first encoding apertures to overlap and admit light from the LED 80 to the photoresponsive element 34 are 76D and 78A as shown by the shutter blade movement which occurs between FIG. 3A and FIG. 3B. The movement from FIG. 3B to FIG. 3C thereafter results in the encoding aperture 76A overlapping the encoding aperture 78B at the same time that the encoding aperture 76C overlaps the encoding aperture 78A. The sequential overlapping of the encoding apertures 76A-76D with the encoding apertures 78A-78D progresses in the manner as illustrated in the remaining FIGS. 3C-3H and provides a sinusoidal output waveform as best shown at 82 in FIG. 3.

Figure 5:
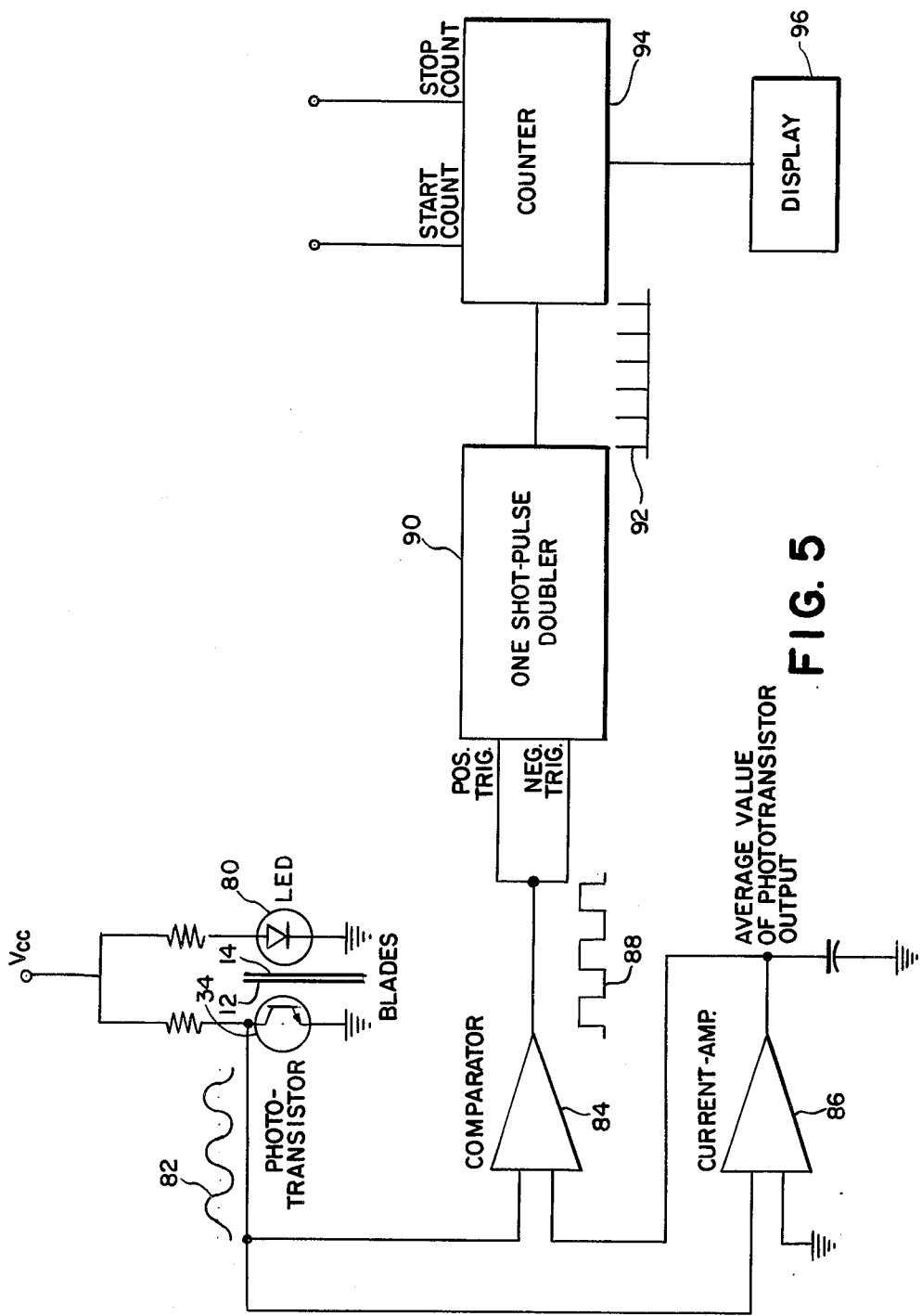
FIG. 5 is a diagram of a circuit for providing an output indicative of the position of the shutter blade elements.

The sinusoidal output waveform 82 is directed to one input of a comparator 84 and to one input of a current amplifier 86 as seen in FIG. 5. Whereas the other input terminal to the current amplifier 86 is grounded, the current amplifier 86 operates to provide an output signal level which approximates the average value of the sinewave 82. This output, in turn, is directed to the other input terminal of the comparator 84 which, in turn, provides an output squarewave as best shown at 88 having a frequency substantially the same as the frequency of the sinusoidal output 82 from the photoresponsive element 34. The squarewave 88, in turn, is directed respectively to a positive trigger input terminal and a negative trigger input terminal of a one shot pulse doubler circuit 90 to provide an output pulse train as best shown at 92. Each pulse of the output pulse train 92 corresponds respectively to either the leading edge or the trailing edge of the squarewave 88. The output pulse train 92, in turn, is directed to a counter 94 having an output display 96 indicative of the number of pulses from the pulse train 92 counted by the counter 94. In this manner, there is provided an output pulse count indicative of the instantaneous position of the blade element 14 and which may be utilized in a manner as is fully described in U.S. Pat. No. 4,317,624, entitled "Strobe Camera Having Range Correlated Scanning Blade Encoding", by Edwin K. Shenk, issued Mar. 2, 1982, in common assignment herewith and now incorporated by reference herein.

Referring now to FIGS. 4A-4H, there is shown a conventional blade encoding system utilizing a plurality of spaced apart apertures 76A'-76D' in a well-known manner. The encoding apertures 76A'-76D' are identical in size and spacing to the encoding apertures of this invention 76A-76D and 78A-78D. However, the photoresponsive element for the conventional shutter blade encoding system as shown at 34' in FIG. 4A must not exceed the width of the apertures 76A'-76D' whereas, by contrast, the photoresponsive element 34 of the encoding system of this invention may be any size larger than twice the width of the encoding apertures.

Referring now to FIG. 4A, it can be seen that the encoding aperture 76D' is in position such that any further incremental movement to the right will admit light to the photoresponsive element 34' and thereby cause an increase in the output response from the photorespective element 34' so as to generate the leading edge of the first cycle in the sinewave 82'. In like manner, the encoding apertures in FIG. 3A are also in position such that any additional incremental movement will operate to admit light to the photoresponsive element 34 and thereby also generate the leading edge of the first cycle in the sinusoidal waveform 82. In FIG. 4B the encoding apertures have moved the same distance as in FIG. 3B; however, the encoding aperture 76D' is still in position to admit light to the photoresponsive element 34' whereas in FIG. 3B the encoding aperture 76D has just moved out of overlapping relationship with the encoding aperture 78A so as to generate the trailing edge of the first cycle in the sinusoidal waveform 82. Referring now to FIGS. 3C and 4C, it can be seen that the encoding apertures have been displaced by the same distance such that in FIG. 4C the encoding aperture 76D' has been moved out of position to admit light to the photoresponsive element 34' and the second half of the first cycle of the sinusoidal waveform 82' is generated. By contrast, however, the encoding apertures 76D and 76C have been displaced respectively entirely past apertures 78B and 78A to generate the second complete cycle of the sinusoidal waveform 82. Thus, it can be seen that for the same diplacement of the blade elements 12 and 14, there is generated by the encoding system of this invention two complete cycles of the sinusoidal waveform 82 in comparison to only one complete cycle of the sinusoidal waveform 82' generated by the conventional encoding system. As is readily apparent, the sinusoidal waveform 82 of the shutter blade encoding system of this invention is subsequently converted by the circuitry of FIG. 5 to provide twice the pulse count as that provided by the sinusoidal waveform 82' from the conventional shutter blade encoding system of FIGS. 4A-4H thereby in effect doubling the resolution of the shutter blade encoding system without any reduction in the width of the encoding apertures or in the spacing between the encoding apertures. In addition, the size of the photoresponsive element 34 in the shutter blade encoding system of this invention is not critical and may be substantially wider than the width of the encoding apertures and still provide the same high resolution in comparison to conventional shutter blade encoding systems where the width of the photoresponsive element must correspond to the width of the encoding apertures and the spacing therebetween and be critically aligned with respect thereto.

Other embodiments of the invention including additions, subtractions, deletions and other modifications of the preferred disclosed embodiments of the invention will be obvious to those skilled in the art and are within the scope of the following claims.

What is claimed is:

1. In a photographic camera apparatus of the type including means for defining a film plane; means for transmitting light from a scene along an optical path to expose photosensitive film located in the film plane; and an exposure control system for allowing the passage of scene light along the optical path to the film plane for a period of time to define an exposure interval, wherein the exposure control system comprises at least two overlapping blade elements disposed for displacement in generally opposing directions with respect to each other, the improvement comprising:

means for sensing the position of the blade elements responsive to the displacement of the blade elements and for providing an output representative of the instantaneous position of the blade elements, said position sensing means comprising a source of illumination on one side of the blade elements, a photoresponsive element on the other side of the blade elements opposite said source of illumination, a plurality of equally spaced apart like apertures in each of the blade elements located such that said apertures in one of the blade elements sequentially overlap the apertures in the other of the blade elements upon displacement of the blade elements so as to control the transmission of light from said source of illumination to said photoresponsive element, and means for converting the output of said photoresponsive element to said output representative of the instantaneous blade position by counting the number of times the apertures in one of the blade elements overlap the apertures in the other of the blade elements.

2. The improvement of claim 1 wherein said apertures are equally spaced apart by a distance substantially equal to the width of said apertures.

3. In a photographic camera apparatus of the type including means for defining a film plane; means for transmitting light from a scene along an optical path to expose photosensitive film located in the film plane; and an exposure control system for allowing the passage of scene light along the optical path to the film plane for a period of time to define an exposure interval, wherein the exposure control system comprises at least two overlapping blade elements disposed for displacement in generally opposing directions with respect to each other, the improvement comprising:

means for sensing the position of the blade elements responsive to the displacement of the blade elements and for providing an output representative of the instantaneous position of the blade elements, said position sensing means comprising a source of illumination on one side of the blade elements, a photoresponsive element on the other side of the blade elements opposite said source of illumination, and a plurality of equally spaced apart like apertures in each of the blade elements located such that said apertures in one of the blade elements sequentially overlap the apertures in the other of the blade elements upon displacement of the blade elements so as to control the transmission of light from said source of illumination to said photoresponsive element wherein said apertures are equally spaced apart by a distance substantially equal to the width of said apertures and said source of illumination comprises a light emitting diode.

4. The improvement of claim 2 wherein the blade elements are disposed for reciprocal movement in opposite directions relative to each other by connection respectively to the opposite ends of a walking beam and rotation of the walking beam in one direction operates to effect such a displacement of the blade elements relative to each other as results in the blade elements cooperatively defining a progressively increasing aperture value.

5. In a photographic camera apparatus of the type including means for defining a film plane; means for transmitting light from a scene along an optical path to expose photosensitive film located in the film plane; and an exposure control system for allowing the passage of scene light along the optical path to the film plane for a period of time to define an exposure interval, wherein the exposure control system comprises at least two overlapping blade elements disposed for displacement in generally opposing directions with respect to each other, the improvement comprising:

means for sensing the position of the blade elements responsive to the displacement of the blade elements and for providing an output representative of the instantaneous position of the blade elements, said position sensing means comprising a source of illumination on one side of the blade elements, a photoresponsive element on the other side of the blade elements opposite said source of illumination, and a plurality of equally spaced apart like apertures in each of the blade elements located such that said apertures in one of the blade elements sequentially overlap the apertures in the other of the blade elements upon displacement of the blade elements so as to control the transmission of light from said source of illumination to said photoresponsive element wherein said apertures are equally spaced apart by a distance substantially equal to the width of said apertures and said position sensing means also includes means for comparing the output from said photoresponsive element with the average value of the output of said photoresponsive element to provide an output squarewave having a frequency corresponding to the frequency at which said apertures in one of the blade elements overlap with said apertures in the other of the blade elements upon blade displacement, means for converting said squarewave to a pulse train wherein each of said pulses in said pulse train corresponds to either a leading edge or a trailing edge of said squarewave, and means for counting the pulses of said pulse train to provide an output pulse count indicative of the instantaneous position of the blades.

6. A photographic camera apparatus of the type including means for defining a film plane comprise:
  means for transmitting light from a scene along an optical path to expose photosensitive film located in the film plane;
  exposure control means for allowing the passage of scene light along said optical path to the film plane for a period of time to define an exposure interval, said exposure control means comprising at least two overlapping blade elements disposed for displacement in generally opposing directions with respect to each other; and
  means for sensing the position of said blade elements responsive to the displacement of said blade elements and for providing an output representative of the instantaneous position of said blade elements, said position sensing means comprising a source of illumination on one side of said blade elements, a photoresponsive element on the other side of said blade elements opposite said source of illumination, a plurality of equally spaced apart like apertures in each of said blade elements located such that said apertures in one of said blade elements sequentially overlap the apertures in the other of said blade elements upon displacement of said blade elements so as to control the transmission of light from said source of illumination to said photoresponsive element, and means for converting the output of said photoresponsive element to said output representative of the instantaneous blade position by counting the number of times the apertures in one of the blade elements overlap the apertures in the other of the blade elements.

7. The camera of claim 6 wherein said apertures are equally spaced apart by a distance substantially equal to the width of said apertures.

8. A photographic camera apparatus of the type including means for defining a film plane comprise:
  means for transmitting light from a scene along an optical path to expose photosensitive film located in the film plane;
  exposure control means for allowing the passage of scene light along said optical path to the film plane for a period of time to define an exposure interval, said exposure control means comprising at least two overlapping blade elements disposed for displacement in generally opposing directions with respect to each other; and
  means for sensing the position of said blade elements responsive to the displacement of said blade elements and for providing an output representative of the instantaneous position of said blade elements, said position sensing means comprising a source of illumination on one side of said blade elements, a photoresponsive element on the other side of said blade elements opposite said source of illumination, and a plurality of equally spaced apart like apertures in each of said blade elements located such that said apertures in one of said blade elements sequentially overlap the apertures in the other of said blade elements upon displacement of said blade elements so as to control the transmission of light from said source of illumination to said photoresponsive element wherein said apertures are equally spaced apart by a distance substantially equal to the width of said apertures and said source of illumination comprises a light emitting diode.

9. The camera of claim 7 wherein said exposure control means comprises a walking beam connected at its opposite ends to said blade elements respectively such that rotation of said walking beam in one direction operates to effect such a displacement of said blade elements relative to each other as results in said blade elements cooperatively defining a progressively increasing aperture value.

10. A photographic camera apparatus of the type including means for defining a film plane comprise:
  means for transmitting light from a scene along an optical path to expose photosensitive film located in the film plane;
  exposure control means for allowing the passage of scene light along said optical path to the film plane for a period of time to define an exposure interval, said exposure control means comprising at least two overlapping blade elements disposed for displacement in generally opposing directions with respect to each other; and
  means for sensing the position of said blade elements responsive to the displacement of said blade elements and for providing an output representative of the instantaneous position of said blade elements, said position sensing means comprising a source of illumination on one side of said blade elements, a photoresponsive element on the other side of said blade elements opposite said source of illumination, and a plurality of equally spaced apart like apertures in each of said blade elements located such that said apertures in one of said blade elements sequentially overlap the apertures in the other of said blade elements upon displacement of said blade elements so as to control the transmission of light from said source of illumination to said photoresponsive element, wherein said apertures are equally spaced apart by a distance substantially equal to the width of said apertures and wherein said position sensing means also includes means for comparing the output from said photoresponsive element with the average value of the output of said photoresponsive element to provide an output squarewave having a frequency corresponding to the frequency at which said apertures in one of said blade elements overlap with said apertures in the other of said blade elements upon blade displacement, means for converting said squarewave to a pulse train wherein each of said pulses in said pulse train corresponds to either a leading edge or a trailing edge of said squarewave, and means for counting the pulses of said pulse train to an output pulse count indicative of the instantaneous position of the blades.

* * * * *